United States Patent [19]
Campbell

[11] 4,037,157
[45] July 19, 1977

[54] ELECTRO-OPTICAL SPEED TRANSDUCER

[75] Inventor: Eugene Campbell, Arvada, Colo.

[73] Assignee: The United States of America as represented by the Secretary of the Interior, Washington, D.C.

[21] Appl. No.: 673,558

[22] Filed: Apr. 5, 1976

[51] Int. Cl.² ............................................. G01P 3/36
[52] U.S. Cl. ................................ 324/175; 250/231 R; 250/233
[58] Field of Search .......................... 324/175, 166; 250/231 R, 231 P, 232, 233; 356/28

[56] References Cited
U.S. PATENT DOCUMENTS

| | | | |
|---|---|---|---|
| 3,654,480 | 4/1972 | Stephenson | 250/231 R |
| 3,685,909 | 8/1972 | Schwartz | 356/28 |
| 3,819,268 | 6/1974 | Johnson | 356/28 |
| 3,878,375 | 4/1975 | Mickowski | 356/28 X |

*Primary Examiner*—Rudolph V. Rolinec
*Assistant Examiner*—Vincent J. Sunderdick
*Attorney, Agent, or Firm*—Gersten Sadowsky; Donald A. Gardiner

[57] ABSTRACT

A speed transducer for measuring the speed of a moving surface comprises a light chopper for alternately completing and breaking the respective light paths between a light source and first and second photodetectors such that the second light path is completed before the first light path is broken. A pulse generator produces a pulse having a duration which is determined by the time interval between completion of the first and second light paths. A converter converts the pulse to a direct current signal proportional to the speed of the moving surface by generating a comparison pulse, the width of which is controllable by a direct current control signal, and comparing the widths of the generator and comparison pulses to produce an error signal which is indicative of the difference in widths. A control signal is generated in response to the error signal which constitutes the desired output when the compared pulse widths are equal. In a second embodiment, the sum of two pulses representing the speed of a rotating surface at two opposed locations is integrated to produce a direct current signal proportional to the concentric rotational speed only.

11 Claims, 29 Drawing Figures

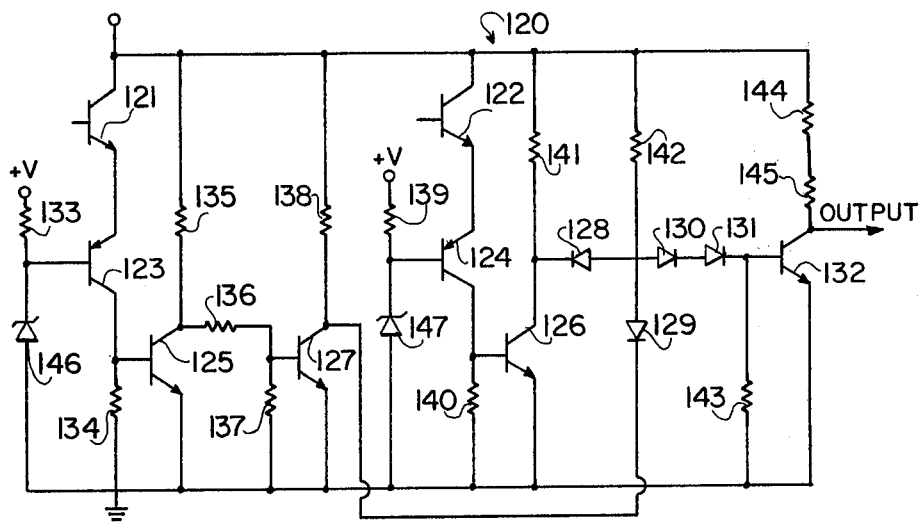
FIG. 3a
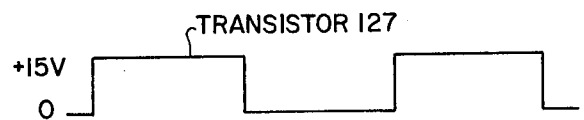
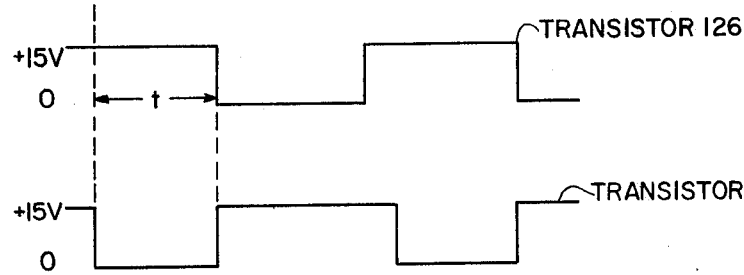

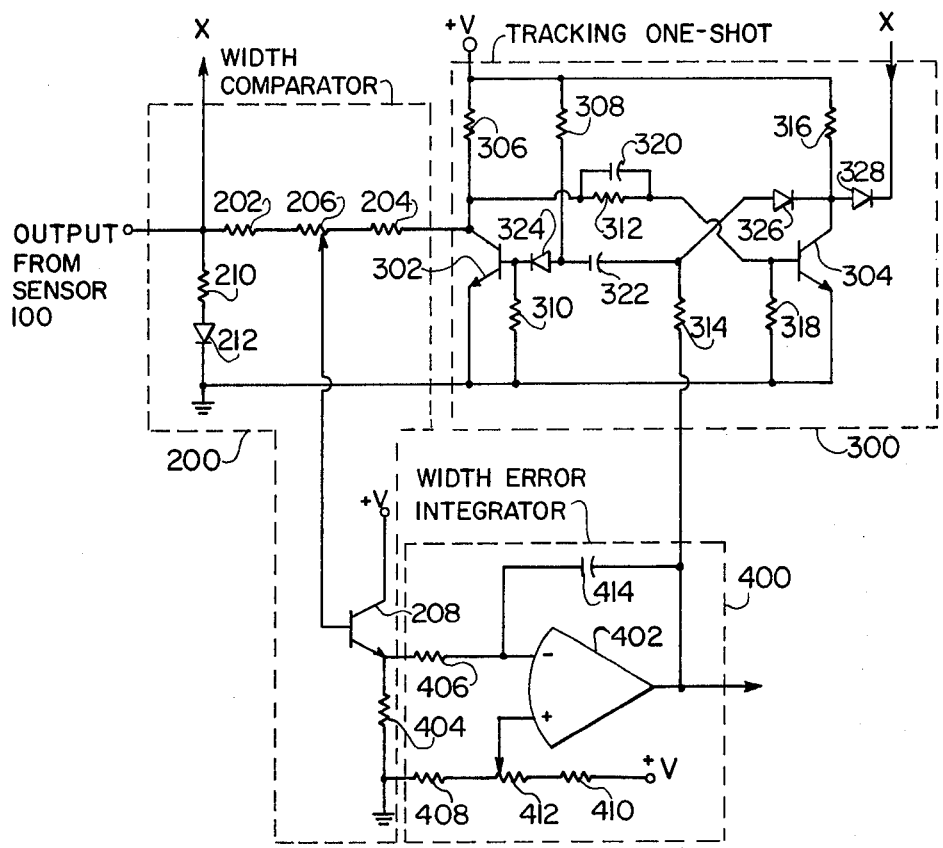
*FIG. 5a*
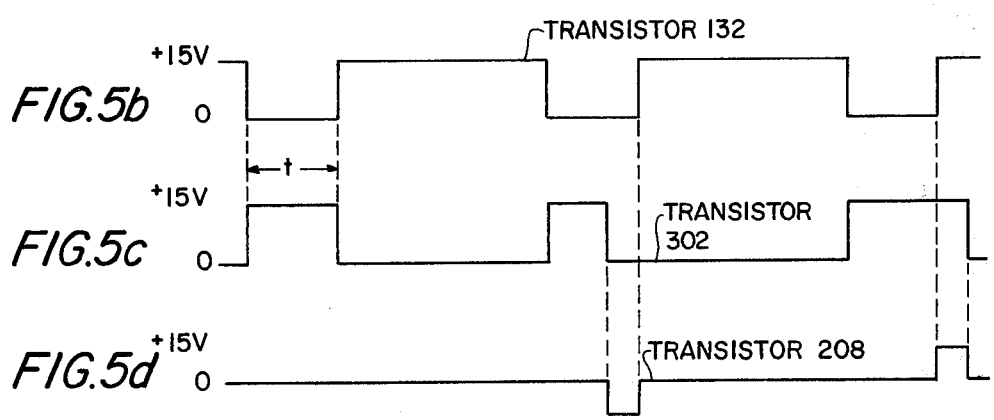

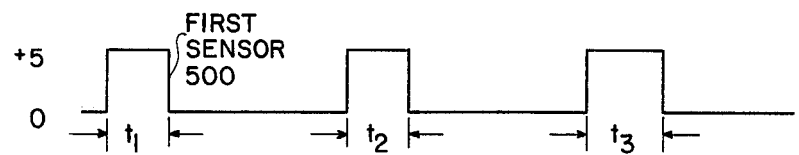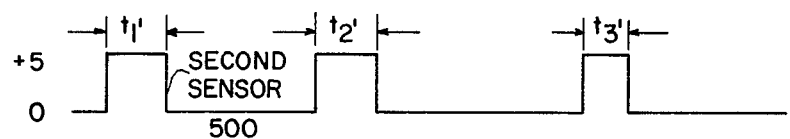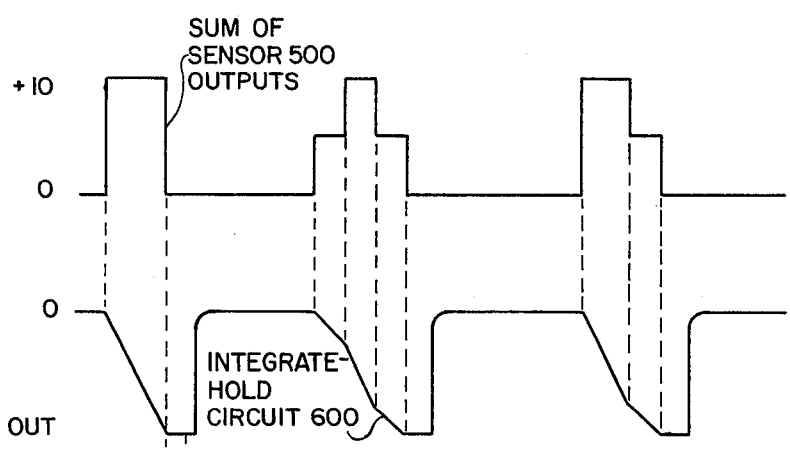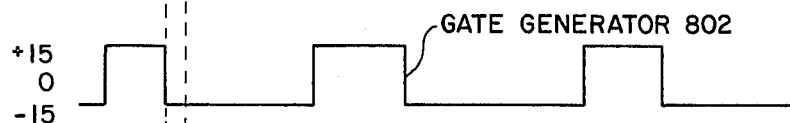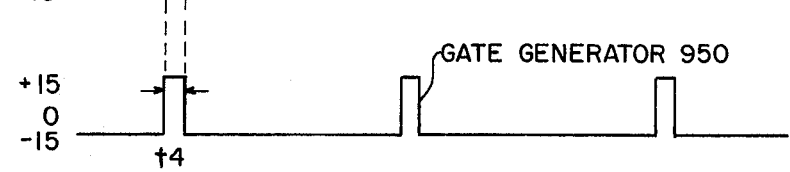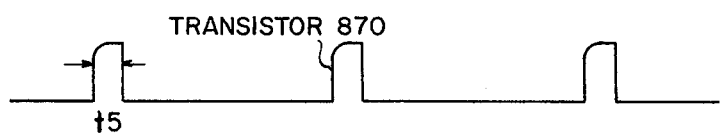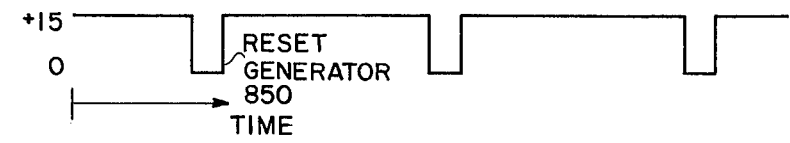

ELECTRO-OPTICAL SPEED TRANSDUCER

FIELD OF THE INVENTION

The present invention relates generally to speed transducers and more specifically to electro-optical speed transducers for measuring the rotational speed of rotating machines.

DESCRIPTION OF THE PRIOR ART

One well-known type of speed transducer employs conventional light choppers of either the reflective of transmissive type to generate an output having a frequency proportional to the speed of a moving surface, and converts the light chopper output into a direct current output signal. It is also known to obtain digital velocity measurements from diametrically opposed points on a rotating member and to sum the digital pulse trains in a counter to obtain an output which is independent of eccentric rotation of the rotating member. An example of a prior art speed transducer embodying both features is described in U.S. Pat. No. 3,654,480 (Stephenson). A serious disadvantage of this, and other prior art speed transducers of this general type, is that such transducers require a high degree of precision in the construction of the light chopper in order to obtain a fast-response, low-ripple, high signal-to-noise ratio, direct-current speed signal.

SUMMARY OF THE INVENTION

This particular disadvantage, as well as other disadvantages of the prior art, are overcome by a speed transducer constructed according to the present invention. In one embodiment of the invention, a transducer is provided comprising a motion detector comprising at least one light source, a pair of first and second photodetectors spaced from the light source and from one another for detecting light radiated by the light source along first and second light paths, respectively, and a light chopper, coupled to the moving surface whose speed is to be measured, for alternately completing and breaking the light paths such that the second light path is completed before the first light path is broken. The transducer further comprises a pulse generator for generating a pulse having a duration which is determined by the time interval between completion of the first and second light paths and which is thus related to the speed of the moving surface. The pulse generator advantageously comprises an inverter for inverting the output of the first photodetector, and a NAND gate for combining the inverter output with the output of the second photodetector to produce the generator output pulse.

According to a further aspect of the invention, the light chopper comprises a moving member having at least one light-passing portion and at least one light-blocking portion of approximately equal widths as measured transverse to the light paths between the light source and the photodetectors in the direction of travel of the moving member, the dimensions of the widths of these portions being approximately twice that of the spacing between the photodetectors. The pulse generator described hereinabove is adapted for use with the light chopper having light-passing and light-blocking portions of approximately equal widths so as to also generate a second pulse having a duration determined by the time interval between breaking of the first and second light paths. Such a pulse generator may include a NOR gate, for combining the inverter output with the output of the second photoconductor, and connected to the NAND gate such that the NAND gate produces the second pulse in response to the output of the NOR gate.

Another aspect of the present invention concerns the provision of means for converting the output pulse or pulses of the pulse generator into a direct current signal proportional to the speed of the moving surface. The converting means comprises means for generating a comparison pulse, the width of which is controllable by a direct current control signal, a comparator for comparing the widths of the comparison pulse and at least one of the generator output pulses and for producing an error signal indicative of the relative difference in widths of the comparison and generator pulses, and means for generating the control signal in response to the error signal in order to equalize the widths of the comparison pulse and generator pulse compared therewith, and such that when the widths of the pulses are equal, the control signal constitites the signal proportional to the speed of the moving surface.

A further aspect of a transducer constructed according to the present invention, as particularly adapted for measuring the rotational speed of a rotating surface, concerns the provision of a transducer further comprising a further pair of third and fourth photodetectors spaced from the light source, from one another, and from the first pair of photodetectors, for detecting light radiated by the light source along third and fourth light paths, respectively. The light chopper comprises a rotatable member coupled to the moving surface for alternately completing and breaking the third and fourth light paths, the first and second pairs of photodetectors being disposed radially with respect to the axis of rotation of the rotatable member in relatively opposed alignment. The transducer comprises a further pulse generator for generating a pulse having a duration determined by the time interval between completion of the third and fourth light paths, an integrator for integrating the sum of the pulses from the first and second generators, and a sampler for sampling the final value of the output of the integrator and producing a direct current proportional to the integrator final value, and thus to the speed of the rotating surface.

Other features and advantages of the invention will be set forth in, or apparent from, the detailed description of the preferred embodiments found hereinbelow.

BRIEF DESCRIPTION OF THE FIGURES

FIG. 3a is a circuit schematic diagram of a first embodiment of a sensor pulse generator constructed according to the present invention;

FIGS. 3b–3d are graphical representations of the output waveforms of various stages of the pulse generator illustrated in FIG. 3a;

FIGS. 4b–4e are graphical representations of the output waveforms of various stages of the sensor pulse generator illustrated in FIG. 4a;

FIG. 5a is a circuit schematic diagram of the remaining blocks of the transducer illustrated in FIG. 1;

FIG. 5b is a graphical representation of the output of the pulse generator of FIG. 3a, and FIGS. 5c and 5d are graphical representations of the outputs at various points in the embodiment of the transducer illustrated in FIG. 5a;

FIGS. 9a–9h are graphical representations of the output waveforms of the various stages of the speed transducer illustrated in FIG. 7.

DESCRIPTION OF THE PREFERRED EMBODIMENTS

Figure 1:
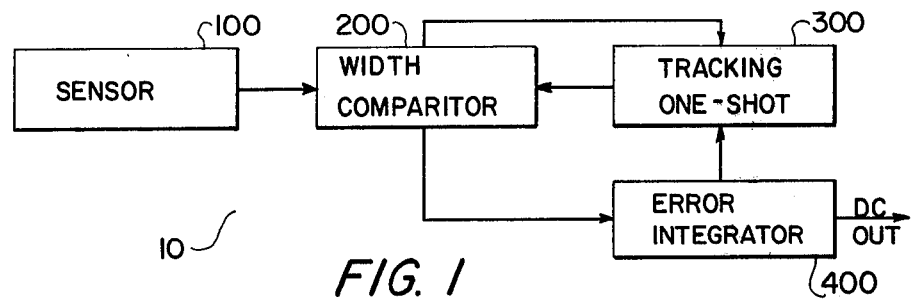
FIG. 1 is a block diagram of a first embodiment of a speed transducer constructed according to the present invention.

Referring to FIG. 1, a first embodiment of a speed transducer constructed according to the present invention will be described. The transducer, which is generally denoted 10, comprises a sensor 100, a width comparator 200 connected to the output of sensor 100, a tracking monostable (one-shot) multivibrator 300 which generates a reference pulse, and an error integrator 400 which provides a control signal for controlling the width of the pulse generated by multivibrator 300 and provides a d.c. output signal proportional to speed.

Figure 2A:
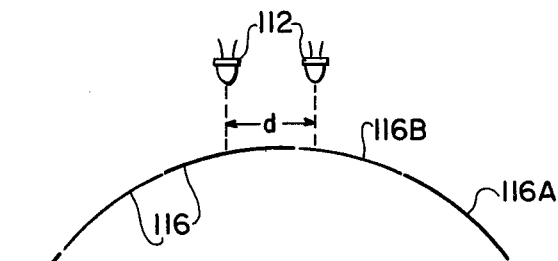
FIGS. 2a to 2c are diagrammatic representations of conventional light chopping arrangements used in sensors constructed according to the present invention.
Figure 2B:
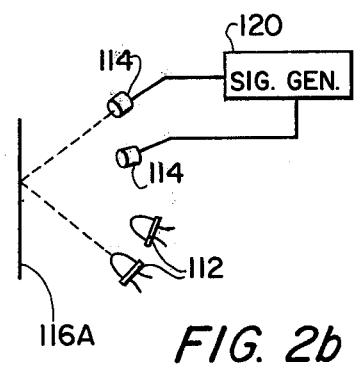
Figure 2C:
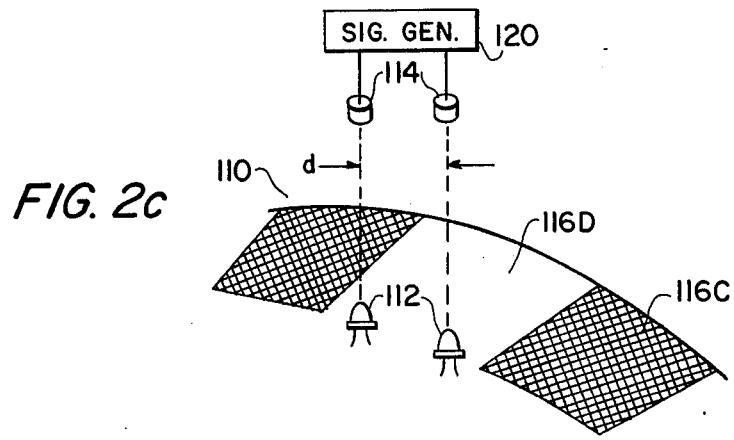

Referring to FIGS. 2a to 2c, sensor 100 comprises a light chopping system 110 and a sensor signal generator 120. Light chopping system 110 may be of any conventional design in which light paths between light source or sources 112 and first and second spaced photodetectors 114 are alternately completed and broken by light chopping elements 116 coupled to the surface whose speed is being sensed. A reflective light chopping system 110 is illustrated in FIGS. 2a and 2b which utilizes alternately spaced reflecting and non-reflecting surfaces 116A and 116B, and a transmissive light chopping system 110 is illustrated in FIG. 2c which utilizes alternately spaced opaque and transparent surfaces 116c and 116D. Both systems can be of forms well known in the art. The preferred relative widths of chopping elements 116 and the spacing between photodetectors 114 is dependent on which embodiment of signal generator 120 is utilized, as will be described in more detail hereinbelow.

Sensor-signal generator 120 generates a rectangular output waveform which, in one embodiment to be described hereinbelow, goes to zero voltage as the light path to the first photodetector 114 is completed and returns to a positive level when the light path to the second photodetector 114 is completed. The width of the rectangular pulse is thus determined by the speed of the surface being sensed and the distance d between the adjacent photodetectors 114 only and is not affected by the width or spacing between chopping elements 116.

In an alternative embodiment of signal generator 120 to be described hereinbelow, generator 120 senses both the leading and trailing edges of the light-passing elements 116, thereby providing additional resolution, by reducing the sensing interval, or providing the capability of achieving the same resolution with fewer reflective/transparent elements 116.

A schematic circuit diagram for the first embodiment of sensor signal generator 120 is illustrated in FIG. 3a. Photodetectors 114 comprise photosensitive transistors 121 and 122, which feed, respectively, transistors 123 and 124, connected as common base amplifiers. The output of transistors 123 and 124 are further amplified by transistors 125 and 126, respectively. The output of transistor 125 is inverted by a transistor 127 connected as an inverter. The output of transistor 127 together with that of transistor 126 form the inputs to a logic NAND gate comprising diodes 128, 129, 130, and 131, and transistor 132. Biasing is provided by the resistors 133, 134, 135, 136, 137, 138, 139, 140, 141, 142, 143, 144, 145, and zener diodes 146 and 147, as shown.

The operation of generator 120 will now be described with reference to FIGS. 3b to 3d, which show the waveforms for transistors 127, 126, and 132, respectively. The output of transistor 127 is positive when a light-passing chopping element 116 is positioned between photosensitive transistor 121 and its corresponding light source 112 and zero when a light-blocking chopping element 116 is positioned between transistor 121 and the associated light source 112. Since the output of transistor 126 is not inverted, as is the case with transistor 125, this output goes to zero when the light path to photosensitive transistor 122 is completed, and is positive while the light path is broken. It will be appreciated that the desired information is the time interval t required for the leading edge of each light-passing element 116 to traverse the distance between the two transistors 121 and 122. This time t corresponds to the time difference between a positive-going transition of the output of transistor 127 and the following, negative-going transition of the output of transistor 126, which, as can be seen by comparing FIG. 3c with FIGS. 3a and 3b, corresponds to the width of the negative-going, or zero-voltage, portion of the output of NAND gate transistor 132. It is noted that the only spacing requirement for light chopping system 110 with this embodiment of generator 120 is that the distance d (see FIGS. 2a–2c) between adjacent photodetectors 114 be less than the width in the direction of travel of the light-passing chopping elements 116.

Figure 4A:
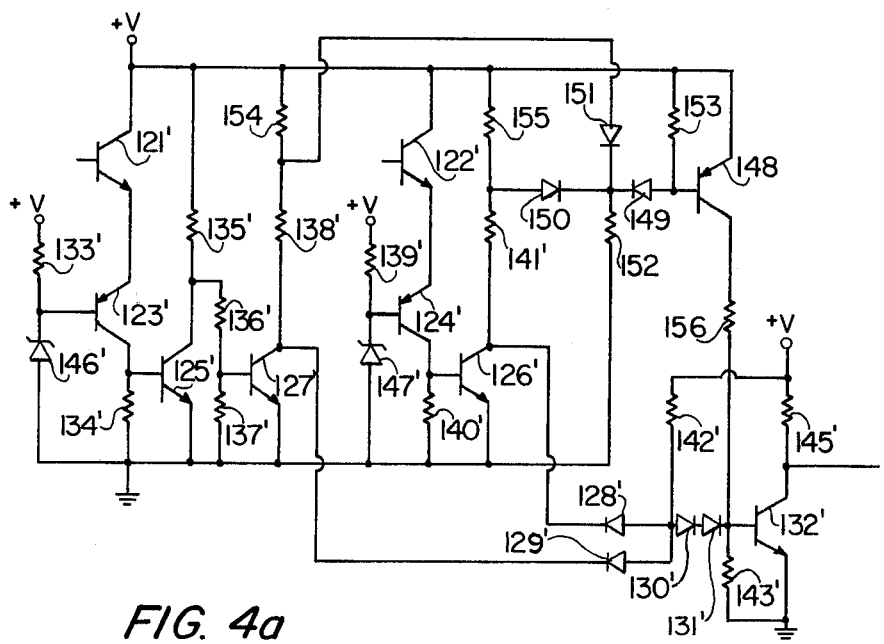
FIG. 4a is a circuit schematic diagram of a second embodiment of a sensor pulse generator constructed according to the present invention.
Figure 4B:
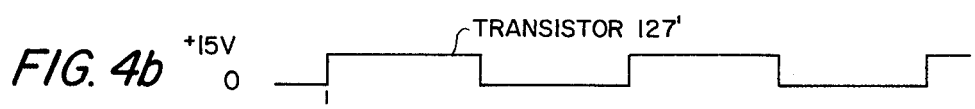
Figure 4C:
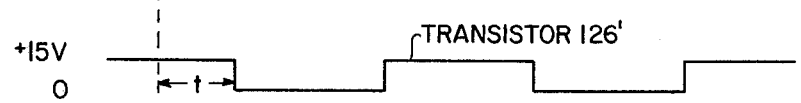
Figure 4D:
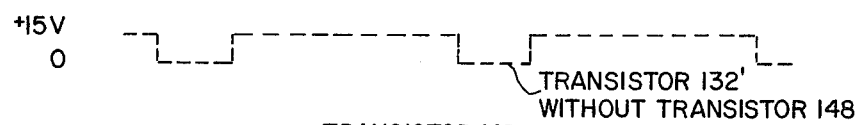
Figure 4E:
Figure 4F:
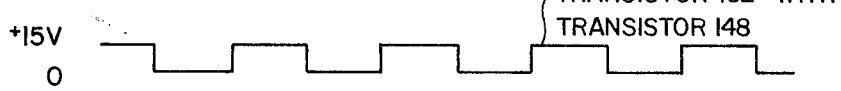

A schematic circuit diagram for the second embodiment of sensor signal generator 120 is illustrated in FIG. 4a. The embodiment illustrated in FIG. 4a is similar to the embodiment illustrated in FIG. 3a and similar elements have been given the same reference numerals with primes attached. In general, FIG. 4a differs from FIG. 3a in the addition thereto of a NOR gate comprising transistor 148 and diodes 149, 150, and 151. Biasing is provided by resistors 152 and 153 and the inputs to transistor 148 are the outputs from transistors 127' and 126', taken across resistors 154 and 155, respectively. The output of transistor 148 feeds the base of transistor 132' directly through resistor 156.

Referring to FIGS. 4b to 4f, which show the output waveforms for transistors 127', 126', 132' (with transistor 148 disconnected), 148, and 132' (with transistor 148 connected), respectively, it can be seen that transistor 132' is switched by the leading edge of a light-passing chopping element 116 in the same manner as the embodiment shown in FIG. 3a, and, in addition, is also switched by the trailing edges of each light-passing chopping element 116 by means of the output of NOR gate transistor 148. Consequently, the desired time interval t corresponds to the widths of both the positive-voltage and zero-voltage portions of the output of NAND gate transistor 132', thus reducing the sensing interval or allowing a resolution equivalent to that of the embodiment shown in FIG. 3a to be attained with fewer light-passing chopping elements 116. In the FIG. 4a embodiment of the pulse generator, the light-passing and light-blocking elements 116 of light chopping system 110 should be approximately equal in width, and the spacing $d$ (see FIGS. 2a–2c) between photodetectors 114 should be about half of the width of chopping elements 116, although, as is the case with the embodiment shown in FIG. 3a, no particular precision in these dimensions is required.

Referring again to FIG. 1, width comparator 200, multivibrator 300, and error integrator 400 are connected together in a feedback arrangement to convert the width $t$ of the output pulses from sensor 100 containing the desired speed information into a direct-current voltage which is inversely proportional to speed. The leading edge of an information-containing output pulse from sensor 100 triggers monostable multivibrator 300, which produces a pulse having a duration determined in part by the output level of error integrator 400. Width comparator 200 compares the width of the triggering pulse from sensor 100 with the width of the pulse from multivibrator 300 and generates error pulses which increase or decrease the output level of integrator 400 depending on whether the multivibrator 300 pulse is narrower or wider than the triggering sensor 100 pulse. The feedback arrangement causes the error pulse to be reduced to zero, i.e., the multivibrator 300 output tracks the sensor pulse width. Therefore, the d.c. output level of integrator 400 causing the tracking contains the desired speed information.

Schematic circuit diagrams of preferred embodiments of width comparator 200, multivibrator 300, and error integrator 400 are illustrated in FIG. 5a. Width comparator 200 comprises fixed resistors 202 and 204, a potentiometer 206, and a transistor 208, connected as shown. Comparator 200 is adapted for use with the output generated by the embodiment of signal generator 120 shown in FIG. 3a by the provision of resistor 210 and diode 212 connected across the input to comparator 200, as shown.

Monostable multivibrator 300 is of conventional design, and comprises transistors 302 and 304, resistors 306, 308, 310, 312, 314, 316, and 318, capacitors 320 and 322, and diodes 324 and 326. The output from sensor 100 triggers multivibrator 300 through diode 328, and the output of integrator 400 is connected to resistor 314, as shown. The RC time constant of capacitor 322 and resistor 308 and the direct-current output level of integrator 400 determine the width of the output pulse of multivibrator 300 which appears at the collector of transistor 302.

Error integrator 400 comprises an operational amplifier 402, and the associated fixed resistors 404, 406, 408, and 410, a variable resistor (potentiometer) 412, and a capacitor 414 connected as shown. The positive input to amplifier 402 is adjusted by means of variable resistor 412 to equal the direct-current level of the output of transistor 208.

The emitter of comparator transistor 208 is connected to the junction of integrator resistors 404 and 406, as shown. The signal output of transistor 208 is a fixed direct-current level when the width of the triggering output pulse from sensor 100 is equal to that of the one-shot pulse output of multivibrator 200, a negative going pulse if the one-shot pulse is narrower than the triggering sensor output pulse, and a positive going pulse if the one-shot pulse is wider than the triggering sensor pulse. These relationships are illustrated in FIGS. 5b to 5d. With the positive input to amplifier 402 adjusted as described hereinabove, the output of amplifier 402 will go more positive, i.e., increase, with negative input pulses from comparator transistor 208, and will go more negative, i.e., decrease, with positive input pulses.

Transducer 10 is aligned by first centering potentiometers 206 and 412 to establish a starting point. The emitter voltage of transistor 208 is then observed on an oscilloscope and potentiometer 206 is adjusted for minimum ripple. Then potentiometer 412 is adjusted until the voltage on its wiper equals the emitter voltage of transistor 208. Any other adjustments are determined by the output circuit used.

Figure 6:
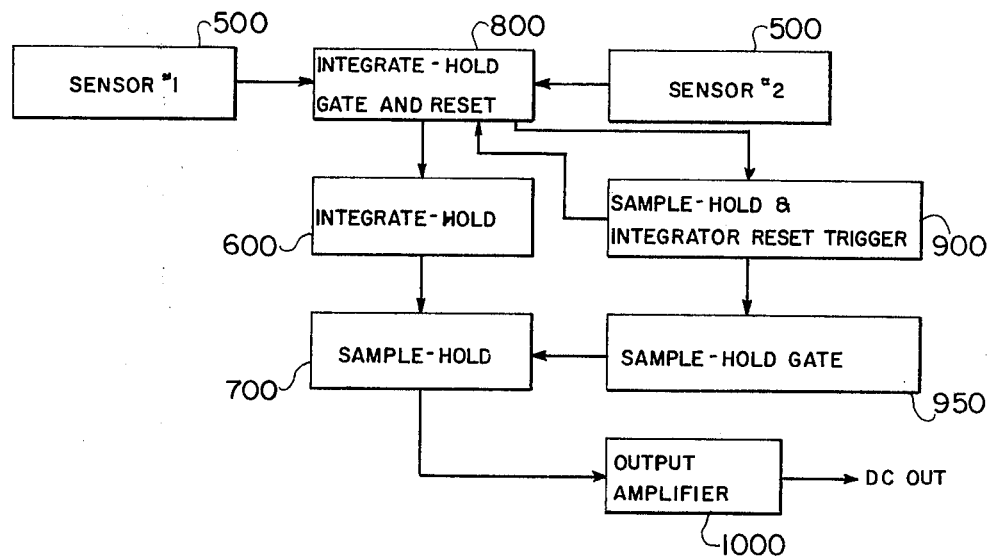
FIG. 6 is a block diagram of a second embodiment of a speed transducer constructed according to the present invention.

Referring to FIG. 6, a second embodiment of a speed transducer constructed according to the present invention will be described, which is insensitive to superfluous movement of a sensed rotating surface caused by, for example, rotor unbalance, bearing runout, or the like. This embodiment comprises first and second sensors 500, an integrate-hold circuit 600, a sample-hold circuit 700, an integrate-hold gate and reset circuit 800, a sample-hold and integrator reset trigger circuit 900, a sample-hold gate circuit 950, and an output amplifier 1000, which are connected as shown.

Figure 7:
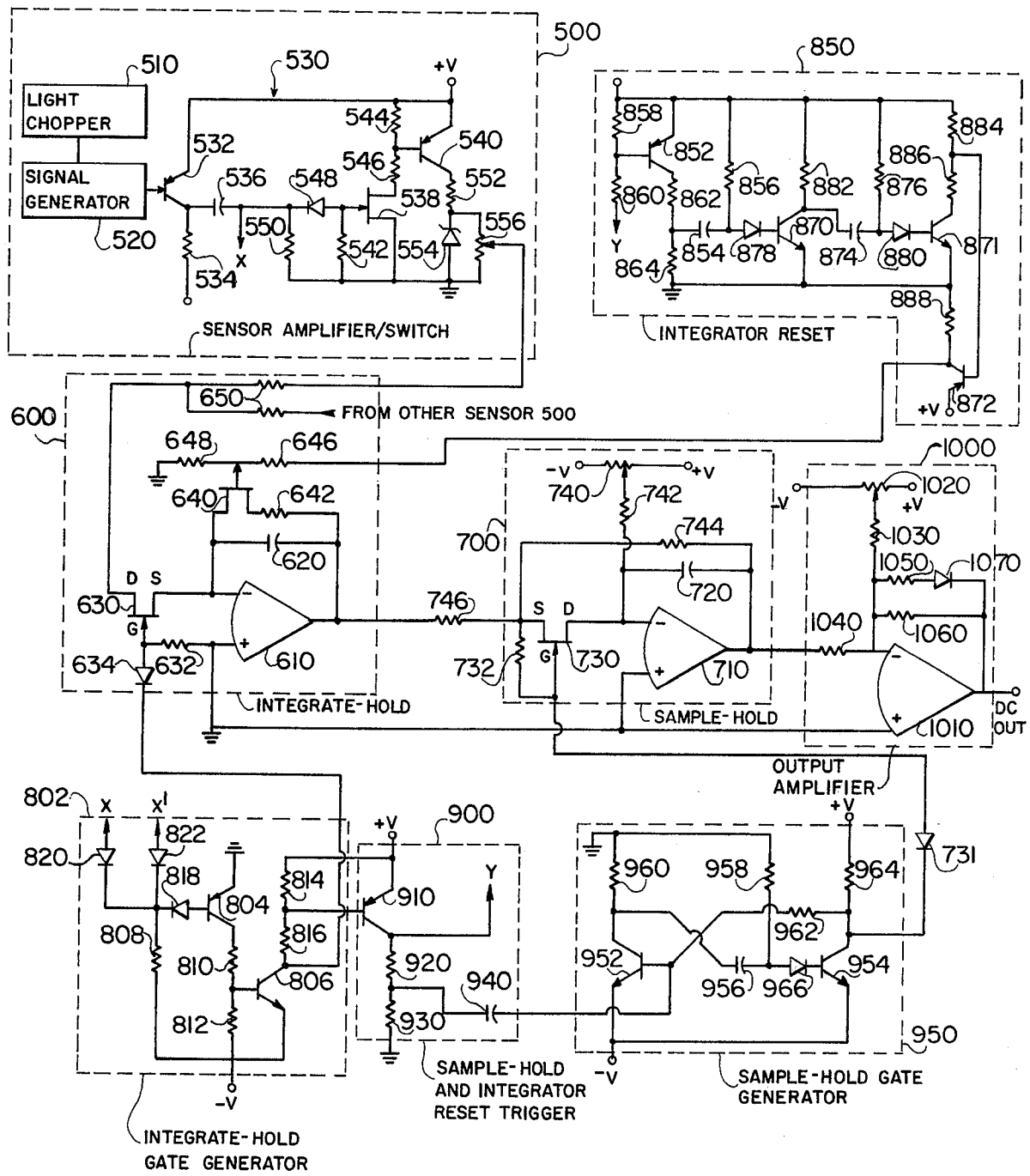
FIG. 7 is a circuit schematic diagram of the speed transducer embodiment illustrated in FIG. 6.

Referring to FIG. 7, sensors 500 each comprise a light chopping system 510, a sensor signal generator 520 and an amplifier/switch 530. A method similar to the sensing method employed with the embodiment of the speed transducer of FIG. 1 described hereinabove is utilized in the speed transducer of FIG. 6 and any of the embodiments of the light chopping systems and sensor signal generators described hereinabove may be utilized for light chopping systems 510 and sensor signal generators 520, respectively. However, only one set of light chopping elements 516 is required, and the pair of photodetectors 514 associated with each signal generator 520 are positioned around the rotating shaft whose speed is to be measured diametrically opposite one another. In addition, if an embodiment of signal generators 520 is used which is equivalent to the embodiment of the signal generator shown in FIG. 3a, the output is taken from the junction of the equivalent of resistors 144 and 145, rather than directly from the collector of the equivalent of transistor 132.

Referring again to FIG. 7, which illustrates the components of one sensor 500, the output of signal generator 520 is capacitively coupled to sensor amplifier/switch 530 through transistor 532 and associated biasing resistor 534 and capacitor 536. The capacitive coupling allows transducer 20 to operate in a slightly degraded manner in the event of sensor failure, as will be described more fully hereinbelow. Amplifier/switch 530 further comprises FET transistor 538 and transistor 540, which function as switches. Resistors 542, 544, and 546 provide biasing, while diode 548 and resistor 550 deliver the switching signals from signal generator 520 to transistor 538, but prevent transistor 538 from drawing gate current on the positive excursion of the switching signal. A junction field effect transistor is used for transistor 538 because of its high input impedance. This high input impedance aids in attaining the proper RC time constant in order to accommodate the lower frequency rectangular waveform signals present on the low end of the transducer speed range. When transistors 538 and 540 are switched on, during the time $t$ referred to hereinabove, the supply voltage V is connected via a dropping resistor 552 to a zener diode 554 having a potentiometer 556 connected thereacross, as shown. The value of dropping resistor 552 is selected to give zener diode 554 a zero temperature coefficient. With a signal generator 520 corresponding to that illustrated in FIG. 3a, the output of amplifier/switch 530, and thus of each sensor 500 is a constant amplitude, rectangular waveform signal which goes positive as the light path to one photodetector of the corresponding light chopping system 510 is completed, and returns to zero when the light path is completed to the adjacent photodetector in the corresponding light chopper 510.

Integrate-hold circuit 600 comprises an operational amplifier (op amp) 610, an integrating capacitor 620, a gating input FET transistor 630 and associated resistor 632, and reset FET transistor 640 and associated resistor 642, connected as shown in FIG. 7. The constant amplitude pulse outputs of sensors 500 deliver constant amplitude current pulses via resistors 650 to the drain electrode of gating transistor 630. Transistor 630 is turned on by gate and reset circuit 800, to be described in more detail hereinbelow, when either or both of the current pulses are present, causing the integrator formed by op amp 610 and capacitor 620 to generate a negative ramp output. The magnitude of the final voltage output attained by integrate-hold circuit 600 is proportional to the integral of the sum of the two sensor 500 current pulses, and is thus inversely proportional to the speed of the surface being sensed. The slope of the ramp output determines the gain of transducer 20 and may be varied by adjusting potentiometers 556 of sensors 500. The integrator ramp output is linear when the outputs from sensors 500 coincide, and exhibits break points when the outputs from sensors 500 do not coincide because of misaligned light-chopping elements 516 or pairs of photodetectors 514 in light-chopping systems 510. However, so long as the sensor 500 outputs overlap on the time scale, the integral of the sum of the sensor 500 outputs will be the same, regardless of whether the outputs coincide or not. Further, any movement of the surface being sensed that increases the signal width of one sensor output, while decreasing the width of the other sensor output, such as is caused by shaft wobble or unbalance, will tend to keep the integral of the sum constant, thus causing little or no change in the final value of the output of integrate-hold circuitry 600. The integrate-hold circuit 600 is reset by the integrate-hold gate and reset circuit 800, as will be described more fully hereinbelow.

The sample-hold circuitry 700 is conventional, and comprises an op amp 710, a capacitor 720, a gating FET transistor 730 and associated resistor 732, a potentiometer 740, and resistors 742 and 744, connected as shown. The output of integrate-hold circuit 600 is fed to the source electrode of transistor 730 through resistor 746. Transistor 730 is turned on at the end of the integrate portion of the integrate-hold cycle of integrate-hold circuit 600 by the pulse output of sample-hold gate circuit 950, to be described in more detail hereinbelow, which is fed to the gate of transistor 730 through diode 736. With transistor 730 turned on, the sample hold circuit 700 becomes a unity gain inverting tracking stage whose output therefore equals the inverse of the final value of the integrate-hold circuit 600. Since the sampling time is shorter than the hold time of the integrate-hold cycle of integrate-hold circuit 600, capacitor 720 preserves the output information from integrate-hold circuit 600 while the integrator is reset to wait for another event.

The integrate-hold gate and reset circuit 800 comprises a gate generator 802 and a reset generator 850. Gate generator 802 generates a gate signal which is fed to the gate of transistor 630 through diode 634. The gate signal is positive when either amplifier/switch 520 is on or both amplifier/switches 530 are on. Gate generator 802 comprises a logic OR gate formed by transistors 804 and 806, and associated resistors 808, 810, 812, 814, and 816. A diode 818 is provided to prevent the reverse base emitter voltage rating of the transistors from being exceeded. The inputs to gate generator 802 are the same capacitively coupled signals from sensors 510 which are routed to the sensor amplifier/switches 530, and are fed to gate generator 802, through diodes 820 and 822, as shown.

Reset generator 850 comprises a reset delay generator formed by transistor 852, timing capacitor 854, timing resistor 856, and the associated biasing resistors 858, 860, 862, and 864, connected as shown. Reset generator 850 further comprises a pulse generator formed by transistors 870, 871, and 872, a timing capacitor 874, a timing resistor 876, associated diodes 878 and 880, and biasing resistors 882, 884, 886, and 888, connected as shown. Transistor 852 is triggered off by the output of trigger 900, to be described hereinbelow, at the end of the integrate period of integrate-hold circuit 600. The charge on capacitor 854 turns transistor 870 off for a reset delay time determined primarily by the RC time constant of capacitor 854 and resistor 856. When transistor 870 turns off, capacitor 874 is charged. At the end of the reset delay time, transistor 870 turns back on, and the charge on capacitor 874 turns off transistor 871. Transistor 871 stays off for a time determined primarily by the RC time constant of capacitor 874 and resistor 876. During the time transistor 871 is off, transistor 872 is on, producing a negative going, or zero voltage pulse output which triggers integrate-hold reset transistor 640 through resistors 646 and 648. As noted hereinabove, the reset delay time of the reset delay generator is longer than the sample time of sample-hold circuit 700. Since the reset delay time determines the hold period of integrate-hold circuit 600, the circuit 600 is not reset until after the output sample has been taken by sample-hold circuit 700.

Both reset generator 850 and sample-hold gate generator 950, to be described hereinbelow, are triggered by trigger 900, which comprises a transistor 910 and associated load resistors 920 and 930, connected as shown to the output of transistor 806 of gate generator 802. Transistor 910 is turned on by the trailing edge of the gate signal generated by gate generator 802.

Sample-hold gate generator 950 is a conventional monostable multivibrator comprising transistors 952 and 954, a timing capacitor 956 and a timing resistor 958, resistors 960, 962, and 964, and a diode 966, all connected as shown. Gate generator 950 is triggered by trigger 900 through capacitor 968. The duration of the one-shot pulse output of generator 950, and therefore, of the sample period of sample-hold circuit 700, is determined principally by the RC time constant of capacitor 956 and resistor 958. As is the case with the other timing circuits, diode 966 prevents the reverse base-emitter voltage rating of the transistors from being exceeded.

Figure 8:
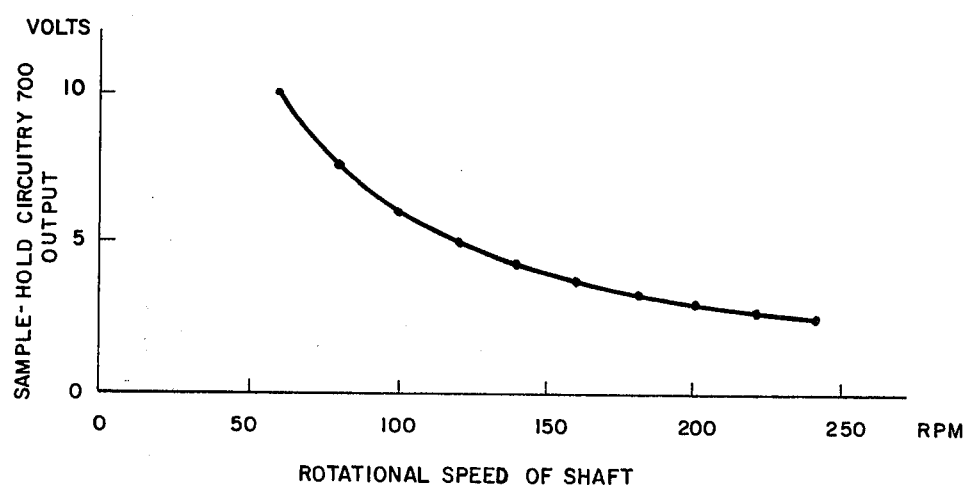
FIG. 8 is a graphical representation of the output of speed transducers constructed according to the present invention.

The output amplifier 100 is provided to adjust gain and improve linearity at a particular operating point by reducing the gain below the operating point. Amplifier 1000 comprises an op amp 1010, a potentiometer 1020, resistors 1030, 1040, 1050, and 1060, and a diode 1070, connected as shown. It is noted that amplifier 1000 may also be used with the transducer 10 embodiment described hereinabove or may be dispensed with. The sensing method used by the speed transducers of FIGS. 1 and 6 results in a nonlinear output voltage per rev/min characteristic, as illustrated in FIG. 8. This characteristic may be advantageous where wide speed range with moderate power supply voltage is desired. In addition, if a linear output is desired, at least two alternatives to amplifier 1000 described hereinabove can be employed. Specifically, if the transducer is to be used in a feed back control system at a constant speed (rev/min), it may be found that the output is sufficiently linear over the small portion of the output characteristic which is involved. On the other hand, if a wide range linear output is desired, a divider circuit (not shown) capable of developing the reciprocal of the transducer output will provide the desired linearity.

FIGS. 9a to 9b illustrate the output waveforms and the relationships therebetween at various stages in an embodiment of the speed transducer of FIG. 6 which utilizes the embodiment of sensor signal generator 520 illustrated in FIG. 3a. FIGS. 9a and 9b illustrate the outputs of the first and second sensors 500, respectively, under three different conditions: (a) properly aligned light chopping systems 510 and no movement of the surface being sensed as a result of shaft wobble or unbalance, indicated by the pulses at the time intervals $t_1$ and $t_1'$; (b) misaligned light chopping systems 510, but no surface movement resulting from shaft wobble or unbalance, indicated by the pulses at the time intervals $t_2$ and $t_2'$; and (c) aligned light chopping systems 510 and surface movement resulting from shaft wobble or unbalance, indicated by the pulses at the time intervals $t_3$ and $t_3'$. FIG. 9c illustrates the sum of the outputs from sensors 500 for the three sets of conditions indicated above, which forms the input to integrate-hold circuit 600. FIG. 9d illustrates the output of integrate-hold circuit 600 under the various sets of conditions indicated above, while FIG. 9e shows the logic OR gating pulse output generated by integrate-hold gate generator 802. FIG. 9f illustrates the gating pulse generated by sample-hold gate generator 950 in response to the trailing edge of the gating pulse output of gate generator 802 for each of the three situations noted above. The pulse width of the output of generator 950 determines the sample time of sample-hold circuit 700. Similarly, FIG. 9g illustrates the output of transistor 870 in integrate-hold reset generator 850, which determines the hold time $t_5$ of integrate-hold circuit 600 before circuit 600 is reset by the pulse output of generator 850. FIG. 9h illustrates the pulse output of generator 850 produced at the end of the delay illustrated in FIG. 9g.

As noted above, the capacitive coupling of each signal generator 520 to the corresponding amplifier/switch 530 in sensors 500 allows transducer 20 to operate in a slightly degraded manner in the event of a sensor failure. If one sensor 500 fails, the corresponding sensor amplifier/switch 530 ceases switching and remains "on" in a saturated condition. A gating signal continues to be generated by integrate-hold gate generator 802 in response to the output of the normal sensor and the output of integrate hold circuit 600 will be a linear ramp similar to that illustrated in FIG. 9d at time interval $t_1$. A slight shift in the direct-current level of the output of the speed transducer may occur, and the speed transducer will not be able to discriminate superfluous movements of the rotating surface being measured. However, if there was no capacitive coupling between signal generators 520 and amplifier/switch 530, then any time the output of a amplifier/switch 530 does not remain zero with failure of the corresponding sensor, which is probable, the speed transducer could not continue to operate. A positive output from the amplifier/switch 530 would keep the OR gate in gate generator 820 from switching, and a negative output would turn off transistor 540 in one or the other of amplifier/switches 530, drastically changing the gain of transducer 20.

The speed transducer of FIG. 6 is aligned by first adjusting potentiometers 556 such that the output of integrate-hold circuit 600 does not saturate above the lowest speed to be measured. (The pulse widths of the sensor 500 outputs, together with the settings of potentiometers 556 determine the output voltage of integrate-hold circuit 600. The width of an output pulse of a sensor 588 is in turn dependent on the spacing $d$ between adjacent photodetectors 514 and the surface velocity of the rotating shaft whose speed is being measured.) The adjustment of potentiometers 556 is made with the shaft to be measured stationary (no inputs to signal generators 520 from photodetectors 514). Potentiometer 740 is then adjusted for minimum drift of sample-hold circuit 700 in the hold mode.

It will be appreciated by those skilled in the art that although the invention has been described relative to an exemplary embodiments thereof, modifications and variations can be effected in these embodiments without departing from the scope and spirit of the invention.

I claim:

1. A speed transducer for measuring the speed of a moving surface, said transducer comprising motion detecting means comprising at least one light source, a pair of first and second photodetectors spaced from said light source and from one another for detecting light radiated by said light source along first and second light paths, respectively, each of said photodetectors producing an output when said light impinges thereon, and light chopping means, coupled to the moving surface, for alternately completing and breaking said light paths such that said second light path is completed before said first light path is broken; and said transducer further comprising means for combining said photodetector outputs such that a pulse is produced having a duration which is determined by the time interval between completion of said first light path and completion of said second light path and which is thus related to the speed of the moving surface.

2. The speed transducer of claim 1 wherein said pulse producing means comprises means for inverting the output of said first photodetector and NAND gate logic means for combining the output of said inverting means with the output of said second photodetector to produce said pulse.

3. The speed transducer of claim 1 wherein said light-chopping means comprises a moving member having at least one light-passing portion and at least one light-blocking portion, said portions being of approximately equal widths transverse to said light paths in the direction of travel of said moving member, and the dimension of said widths being approximately twice that of the spacing between said photoconductors; said transducer further comprising means for combining said photodetector outputs such that a second pulse is produced having a duration determined by the time interval between breaking of said first light path and breaking of said second light path.

4. The transducer of claim 3 wherein said pulse producing means comprises means for inverting the output of said first photodetector and NAND gate logic means for combining the output of said inverting means with the output of said second photodetector to produce said pulse, and said second pulse producing means comprises, NOR gate logic means, for combining the output of said inverting means with the output of said second photoconductor, and connected to said NAND gate logic means such that said NAND gate logic means produces said second pulse in response to the output of said NOR gate logic means.

5. The transducer of claim 1 further comprising means for converting said pulse into a direct current signal proportional to the speed of the moving surface, said converting means comprising means triggered by said pulse for generating a comparison pulse, the width of said comparison pulse being controllable by a direct current control signal, means for comparing the width of said comparison pulse with the width of said first pulse and for producing an error signal indicative of the relative difference in widths of said comparison pulse and said first pulse, means for generating said direct current control signal in response to said error signal in order to equalize the widths of said first and comparison pulses and such that when the widths of said first and comparison pulses are equal, said control signal constitutes said direct current signal proportional to the speed of the moving surface.

6. The transducer of claim 1 wherein the moving surface and light chopping means rotate, and said transducer further comprises a further pair of third and fourth photodetectors spaced from said light source, from one another, and from said first pair of photodetectors, for detecting light radiated by said light source along third and fourth light paths, respectively, each of said third and fourth photodetectors producing an output when said light impinges thereon, said chopping means comprising a rotatable member coupled to the moving surface for alternately completing and breaking said third and fourth light paths, said first and second pairs of photodetectors being disposed radially with respect to the axis of rotation of said rotatable member in relatively opposed alignment; and said transducer further comprising means for combining said third and fourth photodetector outputs such that a further pulse is produced having a duration determined by the time interval between completion of said third light path and completion of said fourth light path, means for integrating the sum of the first mentioned pulse and said further pulse means for sampling the final value of the output of said integrating means and producing a direct current signal proportional to said final value, and thus to the speed of the moving surface sampling the final value of the output of said integrating means and producing a direct current signal proportional to said final value.

7. The speed transducer of claim 1 wherein said pulse generating means comprises switch means, having a high input impedance, for improving the response of said pulse generating means to low surface speeds.

8. The speed transducer of claim 7 wherein said pulse generating means further comprises means for providing a said pulse having a constant amplitude.

9. The speed transducer of claim 6 wherein said integrating means comprises means for holding the final value of the output of said integrating means for a time interval longer than the time interval required for sampling of said integrator output by said sampling means.

10. The speed transducer of claim 6 further comprising amplifier means for improving the linearity of the output of said sampling means about a predetermined operating point by reducing the gain of said sampling means below said operating point.

11. The speed transducer of claim 6 further comprising means for producing an output which is the reciprocal of the output of said sampling means, said reciprocal output being substantially linearly proportional to the speed of the moving surface.

* * * * *